(12) United States Patent
Hammond et al.

(10) Patent No.: US 12,099,889 B2
(45) Date of Patent: Sep. 24, 2024

(54) MULTI STREAM RFID TAG APPLICATOR

(71) Applicant: WestRock Shared Services, LLC, Atlanta, GA (US)

(72) Inventors: Theodore M. Hammond, Nashville, TN (US); John P. Dwyer, Park Heights, MN (US)

(73) Assignee: WestRock Shared Services, LLC

( * ) Notice: Subject to any disclaimer, the term of this patent is extended or adjusted under 35 U.S.C. 154(b) by 0 days.

(21) Appl. No.: 17/539,974

(22) Filed: Dec. 1, 2021

(65) Prior Publication Data

US 2022/0230002 A1    Jul. 21, 2022

(51) Int. Cl.
  *G06K 1/12*   (2006.01)
  *G06K 7/10*   (2006.01)

(52) U.S. Cl.
  CPC .......... *G06K 1/12* (2013.01); *G06K 7/10297* (2013.01)

(58) Field of Classification Search
  CPC .............................. G06K 1/12; G06K 7/10297
  USPC ........................................................ 235/451
  See application file for complete search history.

(56) References Cited

U.S. PATENT DOCUMENTS

| | | | | |
|---|---|---|---|---|
| 7,014,729 B2* | 3/2006 | Grabau | ............ | B31D 1/028 156/290 |
| 7,871,009 B1* | 1/2011 | Blonigen | ......... | G06K 19/07758 235/487 |
| 8,167,017 B2* | 5/2012 | Kolp | ............ | B65C 9/1865 156/767 |
| 8,430,324 B2 | 4/2013 | Baba et al. | | |
| 9,524,460 B2* | 12/2016 | Tsirline | ............ | G06K 19/07749 |
| 2004/0079490 A1* | 4/2004 | Ito | ............ | B41J 3/44 156/247 |
| 2005/0279463 A1* | 12/2005 | Ridenour | ............ | B65C 11/006 156/64 |
| 2006/0081708 A1* | 4/2006 | Blonigen | ......... | G06K 19/07718 235/451 |
| 2006/0185781 A1* | 8/2006 | McLaughlin | ......... | B65C 9/1884 156/DIG. 1 |
| 2009/0072974 A1* | 3/2009 | Miyashita | ......... | G06K 19/07718 340/572.1 |
| 2012/0256732 A1* | 10/2012 | McAllister | ............ | B65C 11/006 340/10.2 |

FOREIGN PATENT DOCUMENTS

| | | |
|---|---|---|
| EP | 1492711 A2 | 1/2005 |
| EP | 1820899 A1 | 8/2007 |
| EP | 2203908 A1 | 7/2010 |

* cited by examiner

*Primary Examiner* — Ahshik Kim
(74) *Attorney, Agent, or Firm* — Neil G. Cohen; Rohini K. Garg

(57) ABSTRACT

A radio frequency identification (RFID) tag applicator including a spool system for holding and guiding a tape including a plurality of RFID tags from a first spool to a second spool, an RFID programmer coupled to spool system to send a programming signal to each of the tags passing from the first spool to the second spool, an RFID reader coupled to the spool system for reading a return signal from a programmed RFID tag in order to reject or accept the programmed tag, and an applicator member operatively coupled to the RFID reader to cause an RFID tag to peel away from the tape onto a passing substrate if the RFID tag is accepted by the RFID reader or pass to the second spool if rejected.

20 Claims, 3 Drawing Sheets

MULTI STREAM RFID TAG APPLICATOR

INCORPORATION BY REFERENCE

The subject application incorporates by reference the entire contents of U.S. Provisional Patent Application Ser. No. 63/139,671, which was filed on Jan. 20, 2021.

BACKGROUND

Technological Field

The present disclosure relates to a tag applicator and more particularly to an RFID tag applicator system for cartons and container blanks.

Description of Related Art

Radio frequency identification (RFID) systems are generally known and may be used for a number of applications such as managing inventory, electronic access control, security systems, automatic identification of cars on toll roads, and electronic article surveillance (EAS). RFID devices may be used to track or monitor the location and/or status of articles or items to which the RFID devices are applied. A RFID system typically comprises a RFID reader and a RFID device such as a tag or tag. The RFID reader may transmit a radio-frequency carrier signal to the RFID device. The RFID device may respond to the carrier signal with a data signal encoded with information stored on the RFID device. RFID devices may store information such as a unique identifier or Electronic Product Code (EPC) associated with the article or item. RFID devices may be programmed (e.g., with the appropriate EPC) and applied to the article or item that is being tracked or monitored. A RFID reader/programmer may be used to program RFID devices and to detect defective RFID devices. Tag applicators have been used to apply programmed RFID tags to items or articles.

Existing RFID applicators, however, are costly and end up being able to serve one particular product line. Also, also today's application systems sometimes mismanage identifiers, by assigning the same unique number of EPC to multiple tags or missing coding altogether. Thus, there exist a need in the art for an applicator system, which is adaptable to multiple product lines and are able to quickly identify and manage mistagged tags. There also remains a need in the art for such systems and components that are economically viable. The present disclosure may provide a solution for at least one of these remaining challenges.

SUMMARY OF THE INVENTION

A radio frequency identification (RFID) tag applicator for cardboard blanks is disclosed. The applicator includes a spool system for holding and guiding a tape, which includes a plurality of initially un-coded or un-programmed RFID tags, from a first spool to a second spool, an RFID programmer operatively connected to the spool system to send a programming signal to each of the tags passing through the spool system, an RFID reader operatively connected to the spool system for reading return signals from programmed RFID tags in order to accept properly programmed RFID tags and reject improperly programmed RFID tags, and an applicator member operatively connected to the RFID reader to cause a programmed RFID tag to peel away from the tape onto a passing substrate if the RFID tag is accepted by the RFID reader or to pass to the second spool if rejected.

It is also considered that the applicator can include a controller operatively connected to the spool system and the RFID reader for accelerating the spool system in order to accelerate the tape if an RFID tag is rejected. The applicator member can include a roller actuating between a pressed and a depressed position to applying the RFID tag to the passing substrate, and can include a blade below the roller for peeling the RFID tag away from the tape when pressed by the roller.

It is also considered that the RFID programmer is directed at a location adjacent to the applicator member. The RFID programmer can be adjacent to the RFID reader. It is also considered that the applicator can include a camera operatively connected to the spool system to detect a presence of an upcoming substrate or cardboard blank intended to be paired with an RFID tag. The camera can be positioned slidably on an arm, at a location downstream of the RFID reader with respect to a travel direction of packing blanks pointed in a direction towards the applicator member.

A system for applying first radio frequency identification (RFID) tags to cut packaging blanks is also disclosed. The system includes a first RFID tag applicator operatively connected to a track configured to be moved along the track and fixed at plurality of positions along the track, a die cutter positioned upstream of the RFID tag applicator to cut and feed a cardboard blank to the tag applicator, and a controller operatively coupled to the tag applicator and the die cutter to meter a tag applicator spool speed to match the die cutter blank output. The first tag applicator can include a spool system and an RFID reader, and wherein the controller is configured to accelerate the spool system in skip an RFID tag rejected by the RFID reader to an RFID tag.

It is also considered that a second RFID tag applicator can be coupled to the track at an adjustable distance from the first RFID tag applicator. A camera can be positioned slidably on an arm, at a location downstream of the die cutter pointed in a direction towards the die cutter to detect a presence of an upcoming blank. A conveyor belt can be located beneath the first tag applicator for advancing the cardboard blanks.

A method of applying radio frequency identification (RFID) tags to packaging is also disclosed. The method includes feeding a packaging blank towards a first RFID tag applicator, sending a programming signal to an individual RFID tag located on a spooling tape holding a plurality of RFID tags of the first RFID applicator, sending a reader signal and receiving a pass/fail bounce back signal to ensure that an RFID tag has been properly programmed, and actuating an applicator member to press a properly programmed RFID tag onto a passing packaging blank. The method can also include actuating an applicator member upwards if an improperly programmed RFID tag is detected and stopping the tag applicator and die cutter if more than two consecutive RFID tags are improperly tagged.

It is also considered that the RFID tags can be pressed onto a surface of a packaging blank, which becomes an inner surface of a package when the blank is erected, and adjusting a distance between the first RFID tag applicator and a second RFID applicator.

It is also considered that the method can include winding the spooling tape onto an ending spool, wherein the wound tape can include improperly programmed RFID tags.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
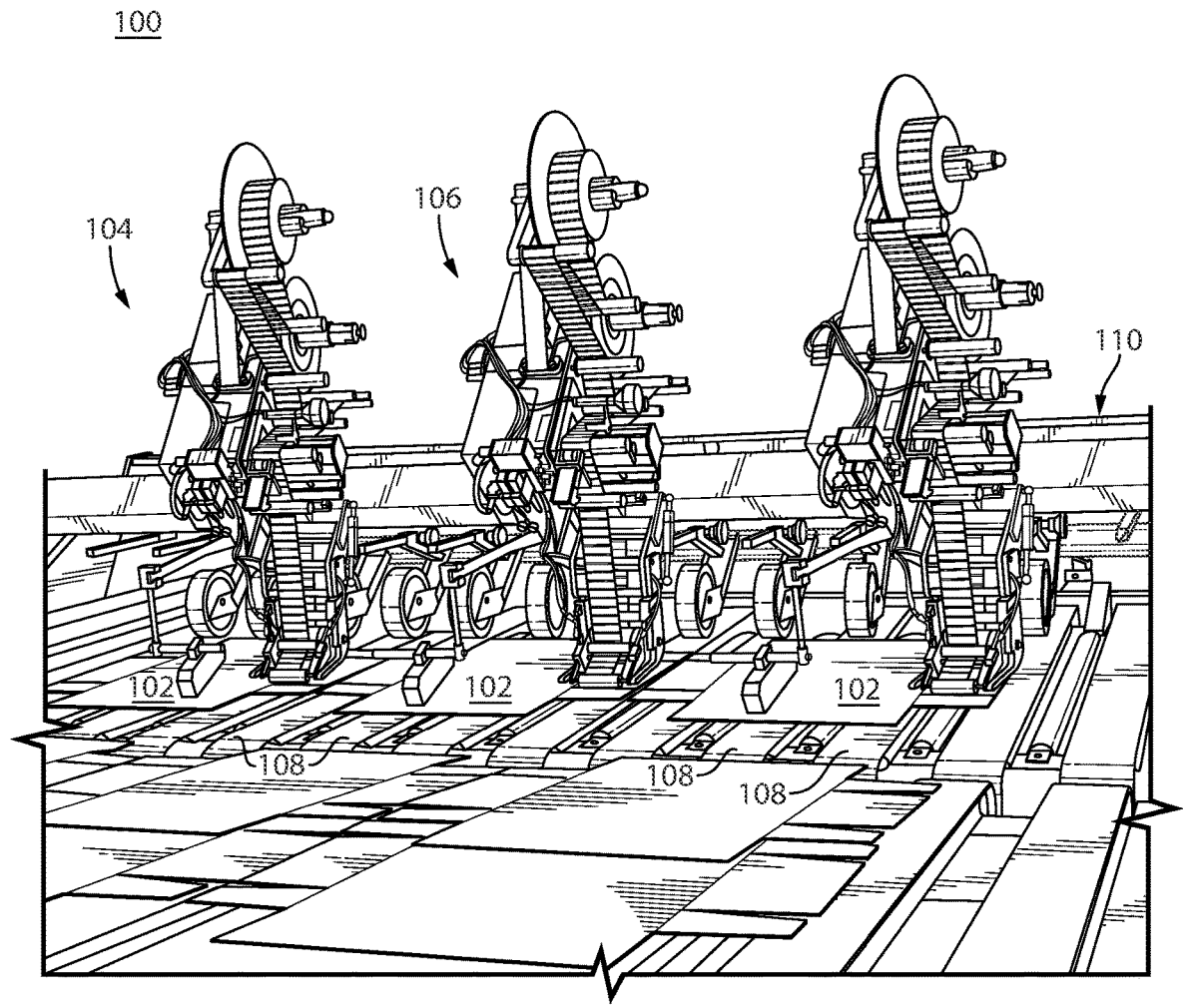
FIG. 1 is a perspective view of a system for applying tags to cardboard blanks according to the disclosure.

Reference will now be made to the drawings wherein like reference numerals identify similar structural features or aspects of the subject disclosure. For purposes of explanation and illustration, and not limitation, a partial view of an exemplary embodiment of an RFID tag system in accordance with the disclosure is shown in FIG. 1 and is designated generally by reference character 100. Other embodiments of the system 100 and methods of use in accordance with the disclosure, or aspects thereof, are provided in FIGS. 2-7, as will be described. The RFID tag system described below can be used to program and confirm the status of RFID tags before they are attached to a packaging blank, and be easily adapted for any size blank.

Referring now to FIG. 1, a system 100 for applying first radio frequency identification (RFID) tags to packaging 102 is shown. The system 100 includes a first RFID tag applicator 104 and a second RFID tag applicator 106. Both the first RFID tag applicator 104 and the second RFID tag applicator 106 are slidably connected to a track 108 and can be moved along the track 108 in order to handle any size packaging that is fed through system 100. The first RFID tag applicator 104 and the second RFID tag applicator 106 are fixed at plurality of positions along the track 108. A die cutter 110 is positioned upstream of the RFID tag applicators 104/106. The die cutter 110 cuts and feeds cardboard blanks of various sizes and configurations to the tag applicators 104/106.

Figure 2:
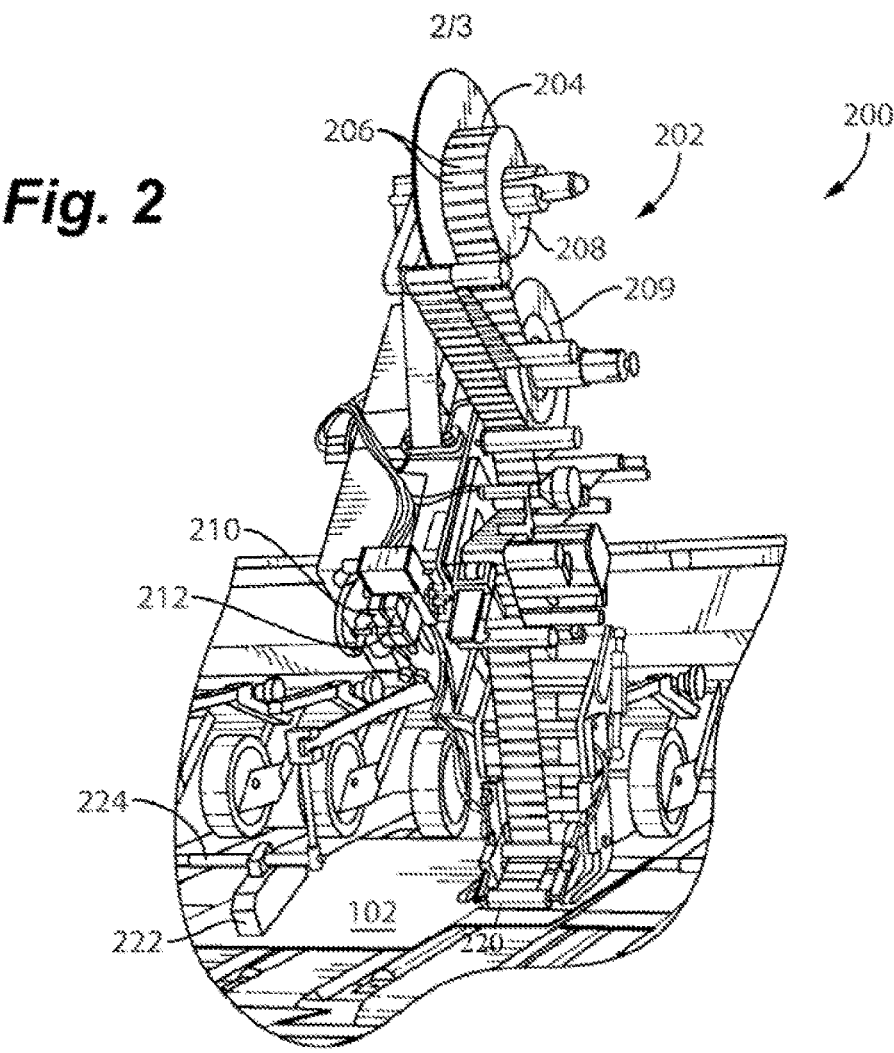
FIG. 2 is a perspective view of an individual tag applicator.

Referring now to FIG. 2, a close up of an RFID applicator 200 is shown. The RFID applicator includes a spool system 202, which contains and guides a tape 204. The tape 204 includes a plurality of initially unprogrammed RFID tags 206. As the tape 204 winds from the first spool 208 to the second spool 209 each of the RFID tags 206 are sent a programming signal by an RFID programmer 210. The programmer 210 sends a signal to each one of the bypassing tags 206. Adjacent to the programmer 210 is an RFID reader 212. The RFID reader 212 and the programmer are positioned on a block 214 and aimed at different tags. The RFID reader 212 checks that each of the tags that had been attempted to be tagged has been tagged or programmed properly. The RFID reader 212 is connected to a system controller 216 and as the tape 204 winds through the system 200, the tape 204 and tags 206 pass by the applicator member 220 that helps peel properly programmed RFID tags from the tape 204 onto a cardboard blank if the RFID tag 206 is accepted by the RFID reader 212 or allows the tags 206 to continue on and be wound onto the second spool 208 if the tags 206 are rejected.

Figure 3:
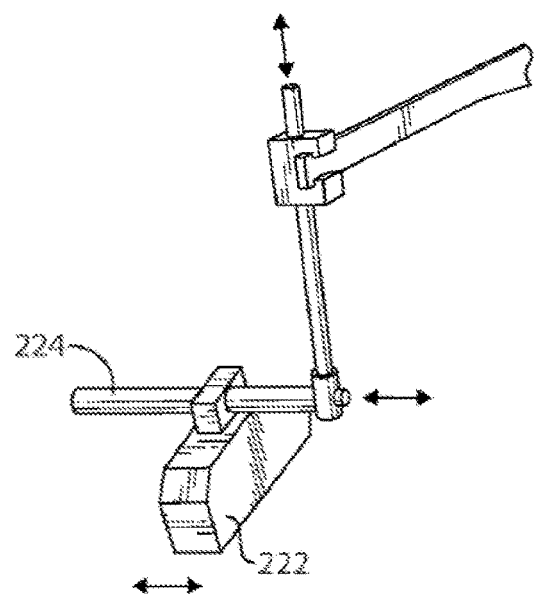
FIG. 3 is a perspective view of a camera slidably positioned on an arm.

Referring to FIG. 3, a camera 222 is positioned slidably on an arm 224, at a location downstream of the RFID reader 212 pointed in a direction towards the applicator member in order to detect a presence of an upcoming cardboard blank. The camera 222 can be slid along arm 224 in multiple directions in order to be positioned properly depending on the size and shape of the cardboard blank. The camera 222 can be slid along a portion of the arm 224, and portions of the arm can also be moved.

Figure 4:
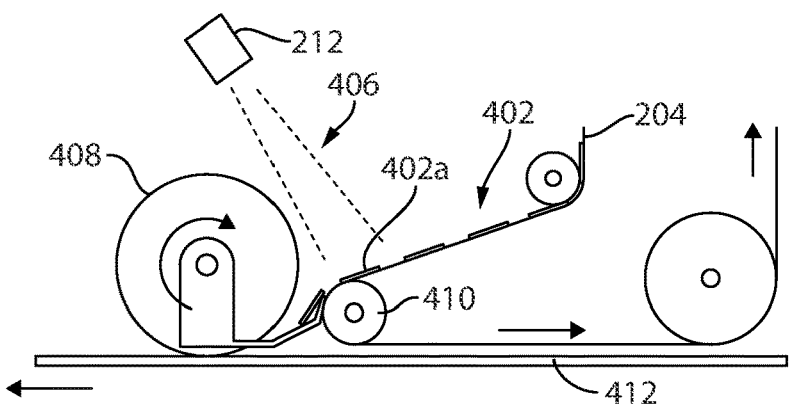
FIG. 4 is a side view of an individual application member in a neutral position.
Figure 5:
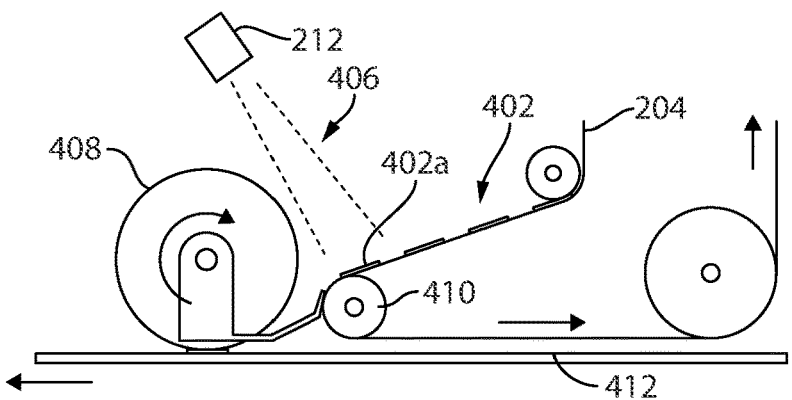
FIG. 5 is a side view of the individual application member of FIG. 4 in a pressed position.
Figure 6:
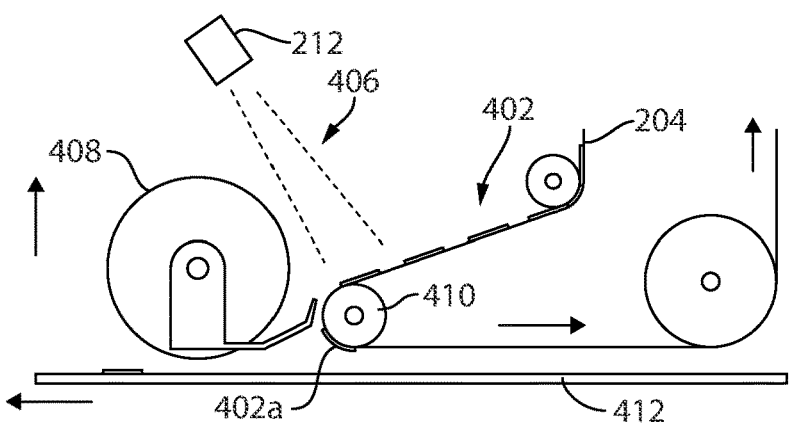
FIG. 6 is a side view of the individual application member of FIG. 4 in a lifted position.
Figure 7:
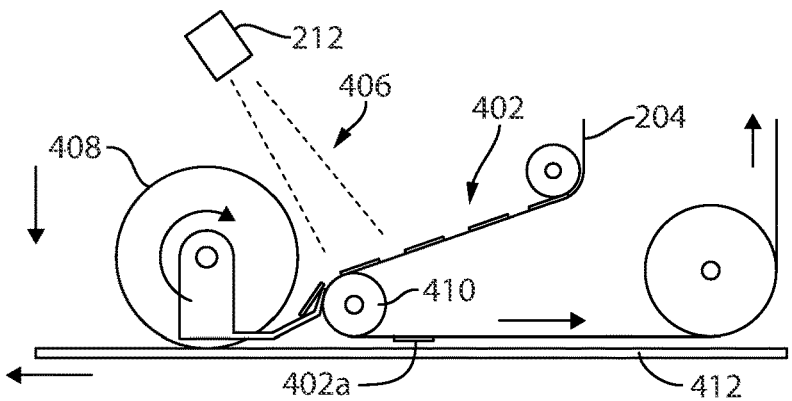
FIG. 7 is a side view of the individual application member of FIG. 4 in a pressed position.

Referring now to FIG. 4-7, a close up of the applicator member is shown in multiple positions passing a tag onto a cardboard blank and allowing a tag to pass to the second spool. In FIG. 4, a series of tags 402 are passing along the system and being programmed by a programming signal 404 and being checked by a reading signal 406. As shown in FIGS. 4 and 5, if the tag is properly tagged and coded the roller 408 presses downward to ensure that the tag sticks to the passing cardboard blank 412. However, as shown in FIGS. 6 and 7, of the reader detects a tag that hasn't been properly coded or hasn't been coded at all, the roller 408 actuates upward ensuring that the tag continues below the minor roller 310 and onto the second spool.

In order to operate system controller 112 shown in FIG. 7 is used to control is paired with the applicator member, the spool speed control, the RFID programmer, and the RFID reader. If the RFID reader rejects a tag, and the roller is moved upward, the spool speed is shortly increased in order to accelerate the next properly coded tag to the same location the improperly coded tag would have been on the cardboard blank. This ensures that no blank is missed and that the tags are always in the same location. However, if more than two subsequent tags are detected to be improper or not coded, the system stops production. The system is not able to speed up by that amount and then subsequently come back down to the original speed, while keeping up with the flow of cardboard blanks.

The methods and systems of the present disclosure, as described above and shown in the drawings, provide for a tag maker capable of programming and confirming the status of RFID tags before they are attached to a packaging blank, and be easily adapted for any size blank. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A radio frequency identification (RFID) tag applicator comprising:

a spool system for holding and guiding a tape including a plurality of RFID tags from a first spool to a second spool;

an RFID programmer operatively connected to the spool system to send a programming signal to each of the tags passing from the first spool to the second spool;

an RFID reader operatively connected to the spool system for reading return signals from programmed RFID tags in order to accept properly programmed RFID tags and reject improperly programmed RFID tags; and an applicator member operatively connected to the RFID reader, wherein in response to the RFID tag being accepted by the RFID reader, the applicator member is configured to cause a programmed RFID tag to peel away from the tape onto a passing substrate and in response to the RFID tag being rejected by the RFID reader, the applicator member is configured to cause the programmed RFID tag to pass to the second spool, wherein the applicator member comprises a roller actuating between a pressed and a depressed position to applying the RFID tag to the passing substrate.

2. The tag applicator of claim 1, further comprising a controller operatively connected to the spool system and the RFID reader for accelerating the spool system in order to accelerate the tape in response to the RFID tag being rejected.

3. The tag applicator of claim 1, wherein the applicator member includes a blade below the roller for peeling the RFID tag away from the tape when pressed by the roller.

4. The tag applicator of claim 1, wherein the RFID programmer is directed at a location adjacent to the applicator member.

5. The tag applicator of claim 1, wherein the RFID programmer is adjacent to the RFID reader.

6. The tag applicator of claim 1, further comprising a camera operatively connected to the spool system to detect a presence of an upcoming substrate intended to be paired with an RFID tag.

7. The tag applicator of claim 6, wherein the camera is positioned slidably on an arm, at a location downstream of the RFID reader with respect to a travel direction of packing blanks pointed in a direction towards the applicator member.

8. A system for applying first radio frequency identification (RFID) tags to packaging comprising:
   a first RFID tag applicator operatively connected to a track configured to be moved along the track and fixed at plurality of positions along the track;
   a die cutter positioned upstream of the RFID tag applicator to cut and feed a cardboard blank to the tag applicator; and
   a controller operatively coupled to the tag applicator and the die cutter to meter a tag applicator spool speed to match the die cutter blank output.

9. The system of claim 8, wherein the first RFID tag applicator includes a spool system and an RFID reader, and wherein the controller is configured to accelerate the spool system in skip an RFID tag rejected by the RFID reader to an RFID tag.

10. The system of claim 8, further comprising a second RFID tag applicator coupled to the track at an adjustable distance from the first RFID tag applicator.

11. The system of claim 8, further comprising a camera positioned slidably on an arm, at a location downstream of the die cutter pointed in a direction towards the die cutter to detect a presence of an upcoming blank.

12. The system of claim 8, further comprising a conveyor belt located beneath the first tag applicator for advancing the cardboard blanks.

13. A method of applying radio frequency identification (RFID) tags to packaging comprising:
   feeding a packaging blank towards a first RFID tag applicator;
   sending a programming signal to an individual RFID tag located on a spooling tape holding a plurality of RFID tags of the first RFID applicator as each individual RFID tag passes from the first spool to the second spool; sending a reader signal and receiving one of a pass or fail bounce back signal to ensure that an RFID tag has been properly programmed; and
   actuating an applicator member to press a properly programmed RFID tag onto a passing packaging blank, wherein the applicator member comprises a roller and the actuating comprises actuating by the roller between a pressed and a depressed position to applying the RFID tag to the passing substrate.

14. The method of claim 13, further comprising actuating an applicator member upwards in response to an improperly programmed RFID tag being detected.

15. The method of claim 13, further comprising stopping the tag applicator and die cutter in response to more than two consecutive RFID tags being improperly tagged.

16. The method of claim 13, wherein the RFID tags are pressed onto a surface of a packaging blank such that the RFID tags become part of an inner surface of a package when the blank is erected.

17. The method of claim 13, further comprising adjusting a distance between the first RFID tag applicator and a second RFID applicator.

18. The method of claim 13, further comprising winding the spooling tape onto an ending spool.

19. The method of claim 18, wherein the wound tape includes improperly programmed RFID tags.

20. The method of claim 17 further comprises cutting the cardboard blank of specific size and configuration before feeding the carboard blank towards the first RFID tag applicator.

* * * * *